United States Patent [19]
Heger et al.

[11] Patent Number: 5,313,713
[45] Date of Patent: May 24, 1994

[54] ELECTRONIC LEVEL WITH DISPLAY SCALE AND AUDIBLE TONE SCALE

[75] Inventors: Charles E. Heger, Saratoga; Donald D. Kook, Los Gatos, both of Calif.

[73] Assignee: Zircon Corporation, Campbell, Calif.

[21] Appl. No.: 930,960

[22] Filed: Aug. 14, 1992

[51] Int. Cl.[5] .......................... G01C 9/06; G01C 9/18
[52] U.S. Cl. ........................................ 33/366; 33/343; 73/1 E; 340/689
[58] Field of Search ................. 33/366, 340, 341, 343, 33/365, 492, 494, 700; 73/1 E; 340/689; 364/559

[56] References Cited

U.S. PATENT DOCUMENTS

| | | | |
|---|---|---|---|
| 4,839,833 | 6/1989 | Parhiskari | 33/494 |
| 4,912,662 | 3/1990 | Butler et al. | 33/366 |
| 4,932,132 | 6/1990 | Baker et al. | 33/366 |
| 5,083,383 | 1/1992 | Hegar | 33/366 |
| 5,136,784 | 8/1992 | Marantz | 33/366 |

FOREIGN PATENT DOCUMENTS

| | | | |
|---|---|---|---|
| 0168150 | 1/1986 | European Pat. Off. | 33/366 |
| 3707345 | 9/1988 | Fed. Rep. of Germany | 33/366 |
| 8806273 | 8/1988 | PCT Int'l Appl. | 33/366 |

*Primary Examiner*—William A. Cuchlinski, Jr.
*Assistant Examiner*—C. W. Fulton
*Attorney, Agent, or Firm*—Skjerven, Morrill, MacPherson, Franklin & Friel

[57] ABSTRACT

An electronic level includes a visual display (similar to a ruler scale) having a number of parallel line segments. The inclination of the device is shown by illuminating various of the scale line segments on either side of the central line. When the device is at a null (typically level or plumb) only the central scale line is illuminated, indicating the inclination away from the null. Each scale line segment indicates 1/64th of an inch of inclination per foot of horizontal distance which conforms to the normal use of such levels by building tradesmen. A multi-tone audio output corresponds to the visual display line segments, with one tone being provided for each increment of inclination arranged in order of the musical scale. A fixed offset mode is provided showing if the device is at a particular slope such as ⅛″ per foot. In addition, a variable user offset mode allows indication of any predetermined inclination within the full 360° range. The level circuitry averages the input signals from a capacitive sensor to provide a crisp indication of the indication of the null position and rapid display of the amount of inclination. User calibration is provided in any physical orientation.

25 Claims, 9 Drawing Sheets

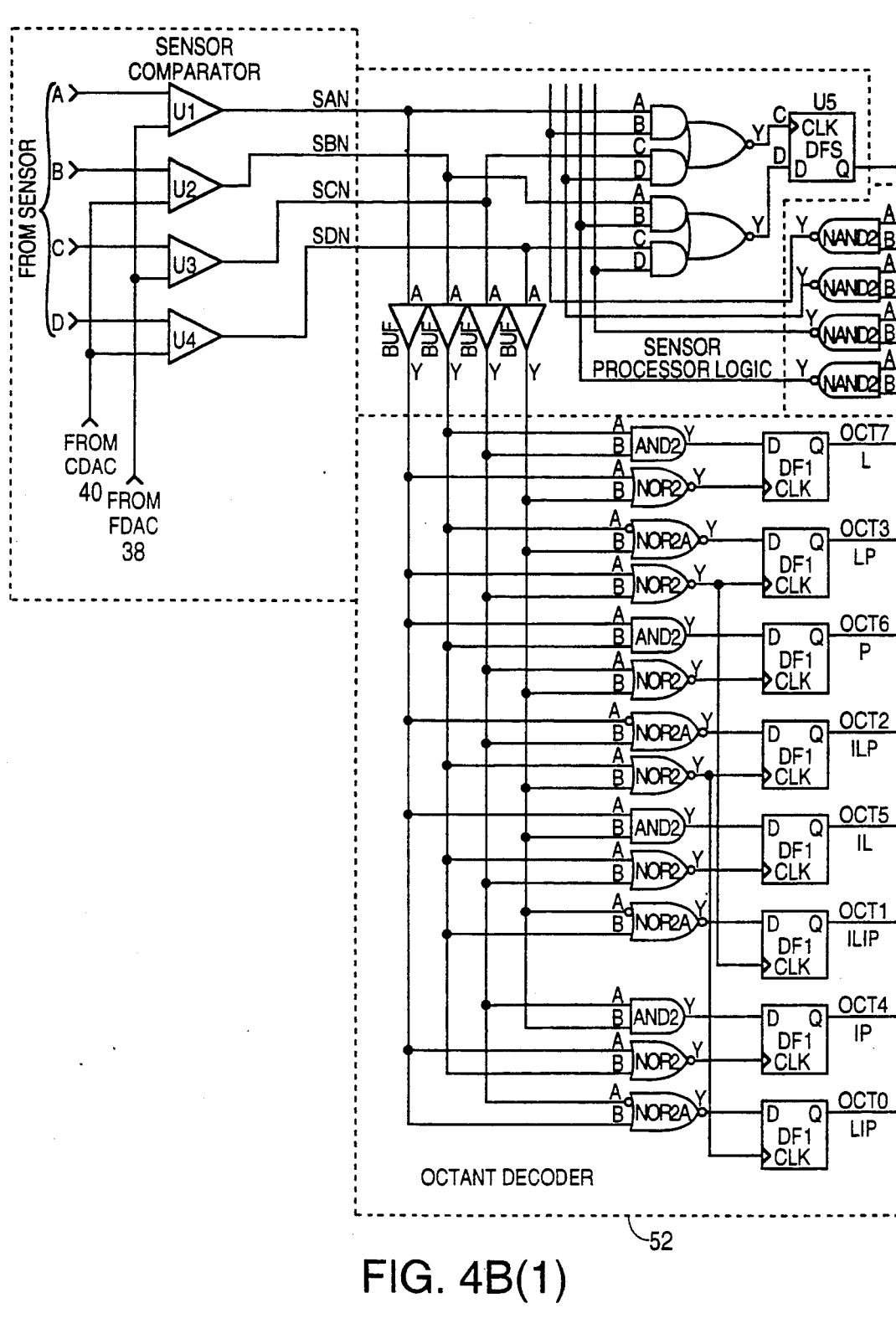
FIG. 4B(1)

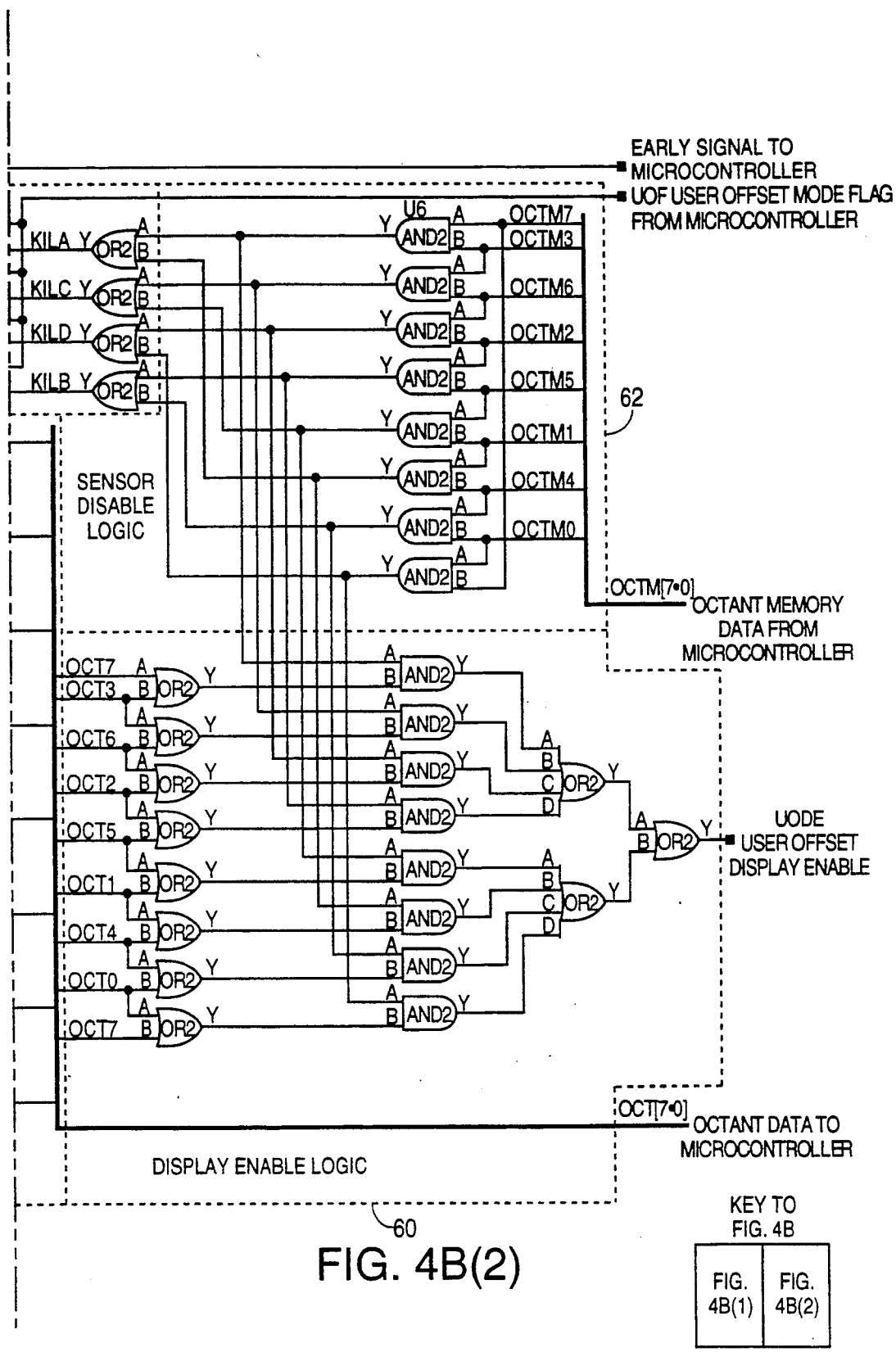
FIG. 4B(2)

| SENSOR ORIENTATION | DATA RESULTS FOR ALL 16 FDAC SUBSTATES | | | | | | | | | | | | | | | | OPPERATIONAL DISPLAY SEGMENTS | TUNE | | | | | | | |
|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | ☐☐☐☐☐☐☐☐☐☐☐☐☐☐☐ | 1 | 2 | 3 | 4 | 5 | 6 | 7 | 8 |
| Out-of-Range CCW | 1 | 1 | 1 | 1 | 1 | 1 | 1 | 1 | 1 | 1 | 1 | 1 | 1 | 1 | 1 | 1 | XXXXXXXX | X | | | | | | | |
| | 0 | 1 | 1 | 1 | 1 | 1 | 1 | 1 | 1 | 1 | 1 | 1 | 1 | 1 | 1 | 1 | XXXXXXX | | X | | | | | | |
| | 0 | 0 | 1 | 1 | 1 | 1 | 1 | 1 | 1 | 1 | 1 | 1 | 1 | 1 | 1 | 1 | XXXXXX | | | X | | | | | |
| | 0 | 0 | 0 | 1 | 1 | 1 | 1 | 1 | 1 | 1 | 1 | 1 | 1 | 1 | 1 | 1 | XXXXX | | | | X | | | | |
| | 0 | 0 | 0 | 0 | 1 | 1 | 1 | 1 | 1 | 1 | 1 | 1 | 1 | 1 | 1 | 1 | XXXX | | | | | X | | | |
| | 0 | 0 | 0 | 0 | 0 | 1 | 1 | 1 | 1 | 1 | 1 | 1 | 1 | 1 | 1 | 1 | XXX | | | | | | X | | |
| | 0 | 0 | 0 | 0 | 0 | 0 | 1 | 1 | 1 | 1 | 1 | 1 | 1 | 1 | 1 | 1 | XX | | | | | | | X | |
| | 0 | 0 | 0 | 0 | 0 | 0 | 0 | 1 | 1 | 1 | 1 | 1 | 1 | 1 | 1 | 1 | X | | | | | | | | X |
| "Level" | 0 | 0 | 0 | 0 | 0 | 0 | 0 | 0 | 1 | 1 | 1 | 1 | 1 | 1 | 1 | 1 | X | X | | | | | | | |
| | 0 | 0 | 0 | 0 | 0 | 0 | 0 | 0 | 0 | 1 | 1 | 1 | 1 | 1 | 1 | 1 | X | | X | | | | | | |
| | 0 | 0 | 0 | 0 | 0 | 0 | 0 | 0 | 0 | 0 | 1 | 1 | 1 | 1 | 1 | 1 | XX | | | X | | | | | |
| | 0 | 0 | 0 | 0 | 0 | 0 | 0 | 0 | 0 | 0 | 0 | 1 | 1 | 1 | 1 | 1 | XXX | | | | X | | | | |
| | 0 | 0 | 0 | 0 | 0 | 0 | 0 | 0 | 0 | 0 | 0 | 0 | 1 | 1 | 1 | 1 | XXXX | | | | | X | | | |
| | 0 | 0 | 0 | 0 | 0 | 0 | 0 | 0 | 0 | 0 | 0 | 0 | 0 | 1 | 1 | 1 | XXXXX | | | | | | X | | |
| | 0 | 0 | 0 | 0 | 0 | 0 | 0 | 0 | 0 | 0 | 0 | 0 | 0 | 0 | 1 | 1 | XXXXXX | | | | | | | X | |
| | 0 | 0 | 0 | 0 | 0 | 0 | 0 | 0 | 0 | 0 | 0 | 0 | 0 | 0 | 0 | 1 | XXXXXXX | | | | | | | | X |
| Out-of-Range CW | 0 | 0 | 0 | 0 | 0 | 0 | 0 | 0 | 0 | 0 | 0 | 0 | 0 | 0 | 0 | 0 | XXXXXXXX | | | | | | | | X |

FIG. 5

ELECTRONIC LEVEL WITH DISPLAY SCALE AND AUDIBLE TONE SCALE

BACKGROUND OF THE INVENTION

1. Field of the Invention

This invention relates to improvements in an electronic level and specifically to improvements in the visual display, providing an audible tone indication of level, and providing sensing in all inclination positions of the level.

2. Description of the Prior Art

Electronic levels known in the art include that sold by Wedge Innovations Inc. and what is disclosed in U.S. Pat. No. 4,912,662 issued Mar. 27, 1990 to Butler et al. (assigned to Wedge Innovations Inc.). The displays of these levels tend to be relatively difficult to read in terms of the amount of inclination from the desired null position (typically level or plumb). Furthermore, prior art electronic level displays such as that disclosed by Butler et al. show the inclination in degrees or percent slope, which are typically not the inclination measurements used by tradesmen (carpenters, masons etc.). Prior art devices often do not provide a satisfactory indication of how far from level or plumb one is, and are not very useful for indicating inclinations other than level or plumb, such as some arbitrary angle, unless one is able to read the display.

Furthermore, typical prior art levels do not indicate audibly to what extent one is off level or off plumb. Additionally, the prior art devices are relatively slow to respond.

SUMMARY OF THE INVENTION

In accordance with the invention, an electronic level visual display includes a number of parallel line segments resembling a typical ruler scale. When the device is at a null (level or plumb or at some other preselected inclination), only the central line segment is illuminated. When the device is inclined at an angle from the null, one or more of the line segments are illuminated starting from the center line segment. The more line segments that are illuminated starting from the center line segment, the greater the amount of inclination indicated. Each line segment in one embodiment indicates 1/64th inch of additional inclination per horizontal foot. The line segments on either side of the central line segment thus provide an indication of inclination in either direction, i.e. that the left end or right end of the device is inclined. Additionally, numerals are provided associated with the scale to show the amount of inclination per foot. Also included is a slope indicator and a numerical indicator for indicating the fixed offset mode. In fixed offset mode the null indication is provided not at level or plumb relative to the plane of gravity, but instead at some fixed angle thereto. Typically this would be for instance ¼ or ⅛ inch per foot which are typically used in construction.

Alternatively, a user determined variable offset mode sets an arbitrary angle as the null, for purposes of transferring an angle. (It has been found that building tradesmen typically prefer either variable user offsets for transferring of arbitrary angles, or a series of fixed offsets such as ⅛ inch, ¼ inch or 1 inch per horizontal foot.) The level operates in a full 360° range.

Additionally, associated with the visual display is an audible indicator which is a scale of musical tones, one tone being associated with one or more of the line segments on either side of the central line. Thus an ascending or descending tone scale is provided as the device is set at various inclinations, which provides an audible indication of the deviation from level or plumb (or from any null position). This is especially useful when the visual scale is not easily readable, i.e. when the device is being used for instance in a blind location or one area having poor light.

Electronic circuitry in accordance with the invention averages over time an input signal from the level capacitive sensor, which improves accuracy of the device. Additionally included is user calibration of all four main physical orientations, i.e. level, plumb, inverted level and inverted plumb. Thus the device provides a rapid visual display or audible indication of the amount of inclination in any position.

BRIEF DESCRIPTION OF THE DRAWINGS

FIG. 4B(1), and 4B(2) show sensor processing and octant decoding gate level logic circuitry.

FIG. 5 shows sensor orientation and data results graphically.

DETAILED DESCRIPTION OF THE INVENTION

The level disclosed herein includes improvements over the level disclosed in commonly owned U.S. Pat. No. 5,083,383 issued Jan. 28, 1992 to Charles E. Heger and entitled "Electronic Capacitance Level With Automatic Electrode Selection". Also, certain features of the level disclosed in commonly owned U.S. patent application Ser. No. 07/810,739 filed Dec. 18, 1991 and entitled "Electronic Capacitive Level With Display,. . . ", U.S. Pat. No. 5,259,118, issued 11/9/93, invented by Charles E. Heger are used herein. Both of the above patent documents are incorporated herein by reference nd it is to be understood that the present invention is intended to be an improvement and/or extension thereover. The capacitive sensing system in accordance with the present invention is that described in U.S. Pat. No. 5,083,383 and therefore is not further described herein.

Figure 1:
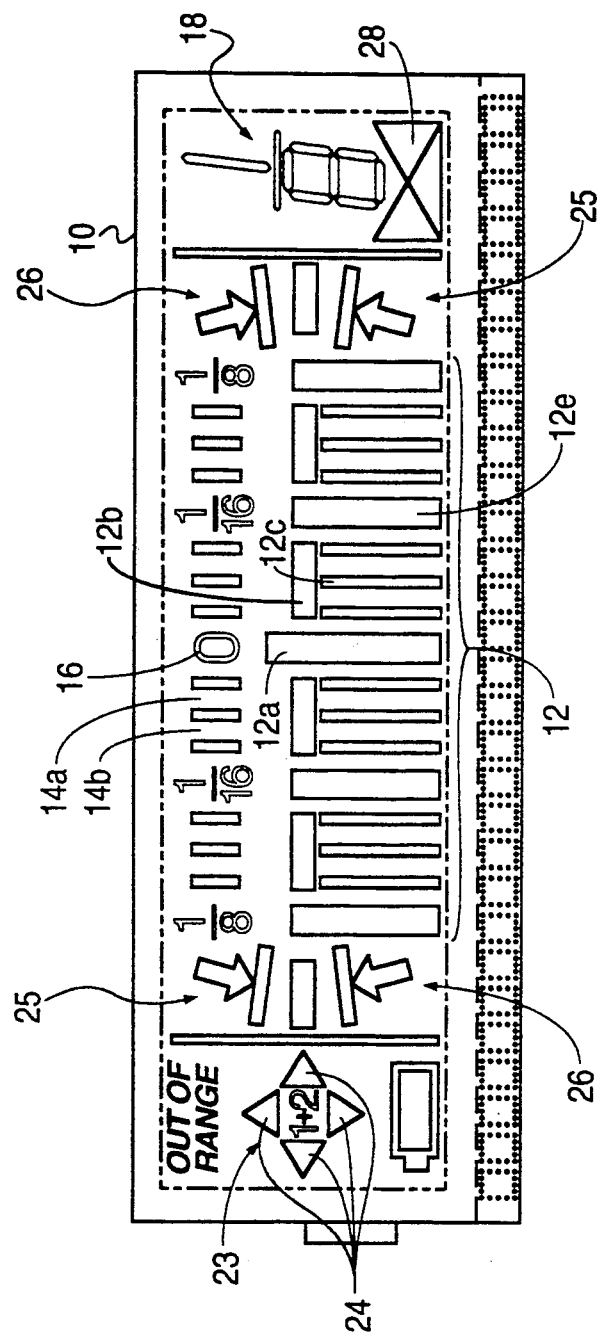
FIG. 1 shows a visual display in accordance with the invention.

FIG. 1 shows visual display 10 of the level in accordance with the invention. It is to be understood that display 1 is conventionally mounted on a convenient surface of the level, the mechanical structure of which is otherwise typical of that used in electronic levels which are well known commercially and sold for instance by Wedge Innovations and Zircon. The chief feature of display 10 is linear display scale 12 which includes as shown a number of parallel line segments including central line segment 12a with shorter line segments 12b, 12c etc. disposed on either side thereof. Every fourth of the line segments is a relatively long side line segment such as 12e as used conventionally in ruler scales for convenience of reading the scale. Disposed immediately above the line segments of scale 12 are short line segments such as 14a and 14b and a central "0" indication 16. Segments 14a, 14b, etc. and 16 are illuminated simultaneously with the immediately adjacent line segments of scale 12.

Also shown alongside line segments 14a, 14b are numbers ⅛, 1/16 to indicate that each line segment 12a, 12b etc. is 1/64th of an inch of inclination per horizontal foot. Thus four such line segments are 1/16th of an inch of inclination. The intention is that as one departs along scale 12 from the central line segment 12a, greater degrees of inclination are shown by illuminating each of the line segments from the center segment 12a out to one end or the other of the scale 12, depending on which end of the display is inclined high, mimicking the action of a conventional bubble vial. Thus an indication of out of null, i.e. typically out of level or out of plumb, is provided both by the display 12 and the line segments 14a, 14b and associated numbers. This is especially advantageous for the building trades in th United States and other countries using the English measurement system. Of course, such a system could easily be adapted for the metric measuring system.

Also provided in the right hand most portion of FIG. 1 is numerical annunciator 18 which includes an illuminated numerical fractions such as ⅛ or ¼. This shows the various fixed offset or user offset modes as described above. For instance, the user by pressing a mode button 22 in FIG. 2, can set the device to indicate a null position at ⅛ inch per foot of slope, or ¼ inch of foot per slope, or 1 inch per foot of slope. This fixed mode is annunciated by display portion 18. If the level is in the user offset mode, display 18 instead illuminates the letter A in the denominator portion of display 18. This indicates that the user has entered the user offset mode, by which one may indicate a null at any arbitrary angle.

Also provided is out of calibration indicator 24 (including a calibration step indicator) which by illuminating one or more of the four triangles incorporated therein indicates that the device has invalid calibration at that particular inclination and valid information cannot be shown by the scale 12. (It is to be understood that the scale 12 has a maximum indication of out of null of only ⅛ of an inch per linear foot.) Another feature of display 10 is direction of rotation indicators 25 and 26. These are line and arrow indicators which indicate when the device is out of null and also in which direction one must rotate the device to achieve the null. Such a feature is described in the above-described copending patent application Ser. No. 07/810,739 now Pat. No. 5259118.

Also shown is ramp indicator 28 which indicates on which side of true level the device is oriented in while in the fixed offset mode.

It is to be understood that the above described visual indications may be provided by a number of different electronic arrangements. The above-described musical tone scale for audible inclination indication has one tone associated with one or more of the line segments on either side of the central line segment 12a of scale 12. Again, the musical tone may be provided by any one of a number of different arrangements of electronic circuitry, only one of which is disclosed herein.

Figure 2:
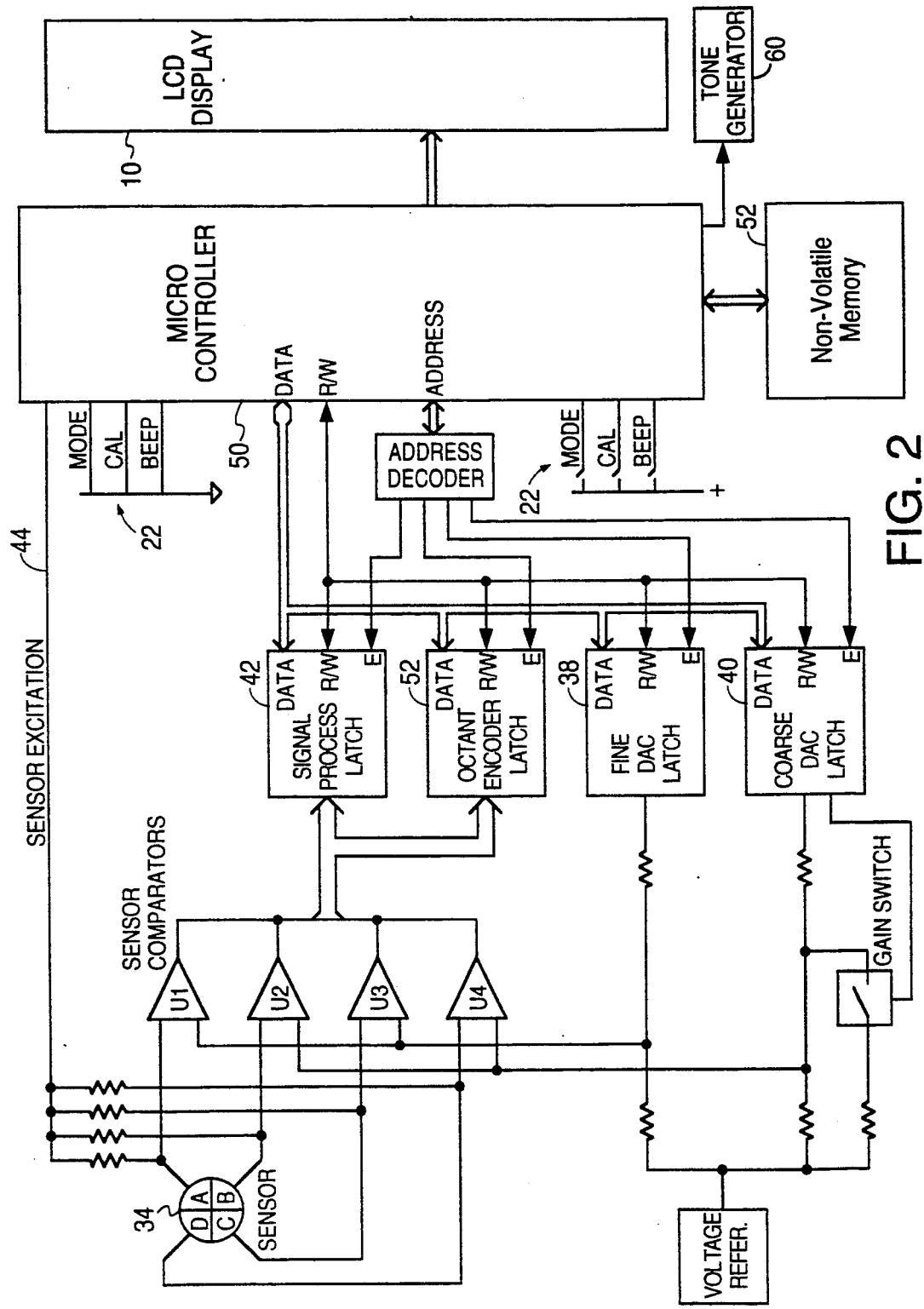
FIG. 2 shows a block diagram of the electronic circuitry in accordance with the invention.

The following description of electronic circuitry is of one embodiment of the invention and provides a rapidly responding visual display and tone processing, with accurate indication of inclination. A combination of an application specific integrated circuit (ASIC) and a programmed microcontroller is utilized for the electronic portions of the level in this embodiment, a block diagram of which is shown in FIG. 2 It is to be understood that one of ordinary skill in the art could write the microcontroller program in light of the detailed operating steps described hereinafter.

The four exponential R-C timing signals from the sensor 34 electrodes A to D are processed by conventional comparators U1, U2, U3, U4 as described in U.S. Pat. No. 5,083,383, utilizing the automatic electrode selection technique. The reference voltage for each pair of diagonally opposed comparators U1, ..., U4 is derived from two digital-to-analog converters (DAC's) with sensor comparators U1 and U3 driven by an 8 bit DAC 38 called FDAC (fine DAC) and electrode comparators U2 and U4 driven by a four bit DAC called CDAC 40 (coarse DAC).

Figure 3A:
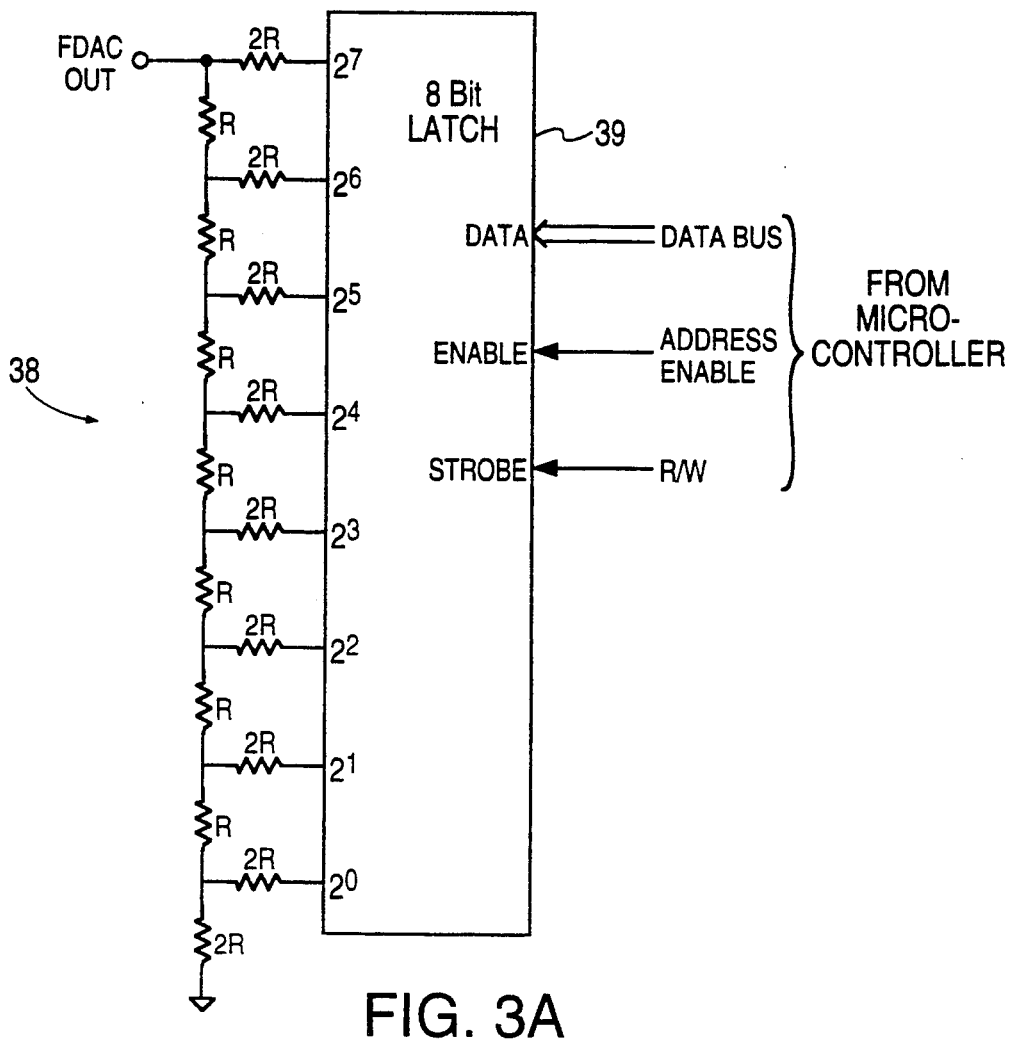
FIGS. 3A and 3B show detail of FIG. 2.
Figure 3B:
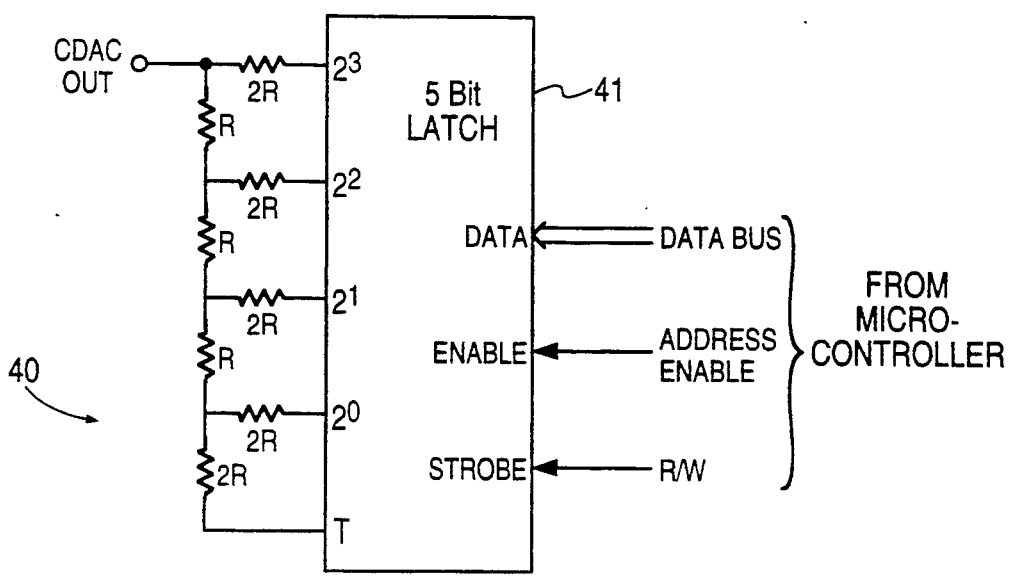

Each DAC 38, 40 includes respectively a latch circuit 39, 41 as shown in FIGS. 3A, 3B for retaining the data, and whose outputs are connected to an R-2R resistor network to derive the analog voltage. Schematics for the two DAC's 38,40 are shown in FIGS. 3A, 3B, FIG. 3A showing FDAC 38 including latch 39 and FIG. 3B showing CDAC 40 including latch 41.

AVERAGING

The output of the Signal Processor Latch 42 will be a binary "1" or "0" after the sensor excitation pulse provided on line 44 from microcontroller 50, depending upon the orientation of the level.

To help remove system noise, the result of a number of excitation pulses are averaged by the program of microcontroller 50. In one version the number of cycles averaged is 100, with the following criteria: if the number of accumulated "1"s is less than 45 over a 100 cycle period, the averaged data is a "0"; if the accumulated "1"s is greater than 55 the average data is a "1"; if the accumulated "1"s is between 45 and 55 the previous averaged data result will be used. This allows a 10% "noise band" to exist suppressing small physical (motional) and system noise which yields a "crisp" display and tone output.

AVERAGING CALIBRATION

In normal mode operation (indicate level/plumb), the CDAC 40 is fixed at half scale by microcontroller 50 of FIG. 2 by writing the value 1000 binary into the CDAC latch 41. During user calibration for any given axis (Level, Plumb, etc.) the FDAC 38 is cycled by microcontroller 50 (which is a conventional 4 bit device with an 8 bit external bus) in a successive approximation routine (SAR) starting with the most significant bit (MSB) and the 8 bit result temporarily stored by the microcontroller 50. The level is then rotated 180° in the plane of the current working surface by the user and the FDAC 38 again cycled through the SAR routine and the result temporarily stored. These two temporary results are then averaged via a conventional math routine in the microcontroller 50 to ascertain their mean value. This mean value is then conventionally stored in the non-volatile memory 52 and becomes the calibration word (value) for the particular axis calibrated.

This routine is repeated for each of the four primary axes of the level.

LCD display 10 calibration arrows arrows 24 of FIG. 1 indicate each axis calibration status:
 solid on: not calibrated
 blinking: calibration in process
 off calibrated In addition to the calibration arrows 24, a numeral 1 or 2 in display 23 is displayed during the calibration cycle to alert the user to the calibration step in process i.e.:
"1": first cal step
"2": second cal step After the calibration cycle for any axis is complete, both numerals 1 and 2 of display 23 are extinguished.

OCTANT DECODING

Figure 4A:
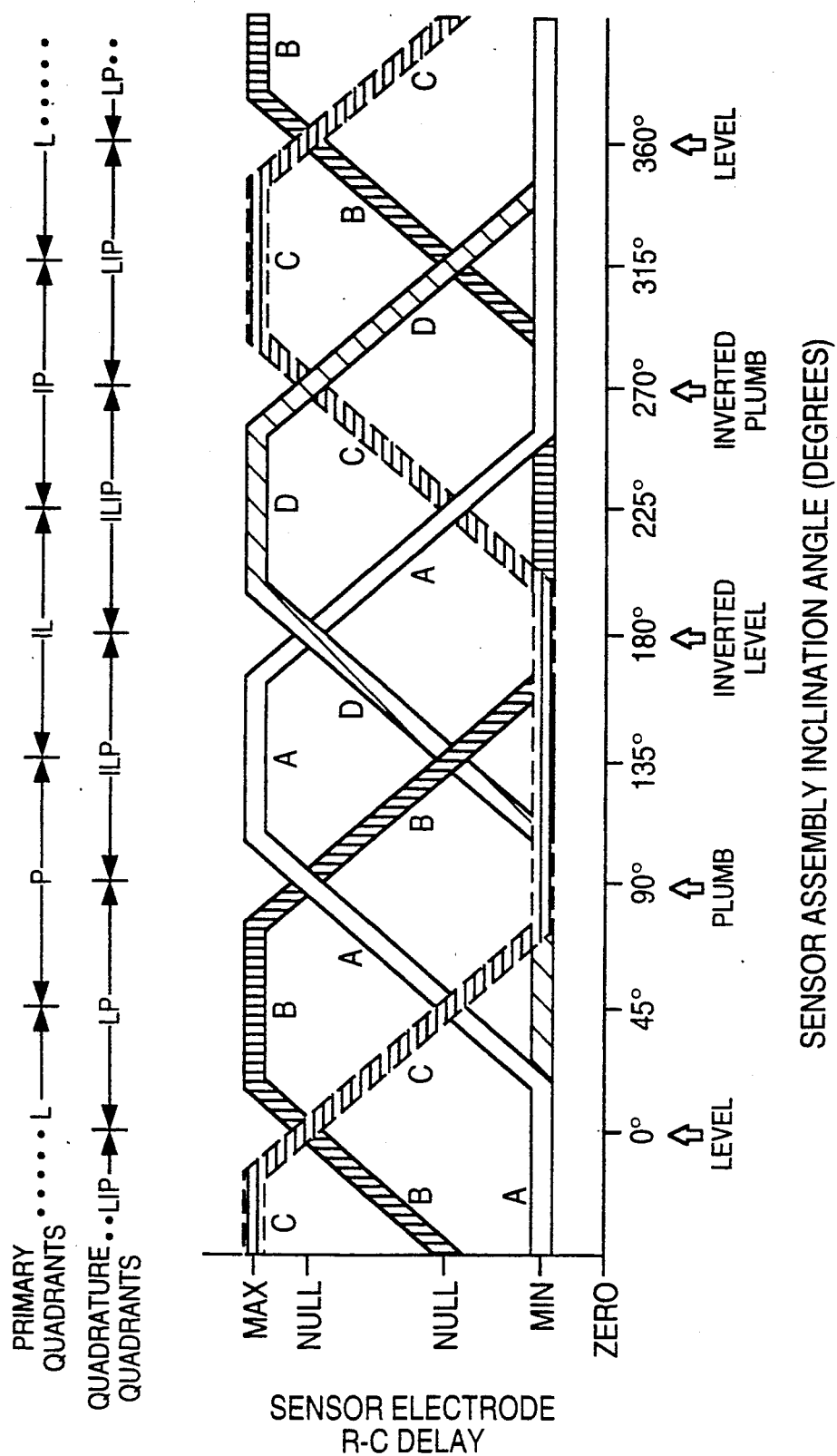
FIG. 4A shows octant decode timing.

The outputs of the four sensor comparators U1, ..., U4 are decoded by octant decoder logic 52 to sense the octant within which the sensor 34 is currently oriented. This decoding, shown in FIGS. 4A and 4B is related to the technique described in U.S. Pat. No. 5,083,383 at FIG. 1B. Decoding is accomplished by sensing the timing relationships of the four sensor 34 electrodes A, B, C, D. Sensor electrode timing relationships are shown in FIG. 4A along with the eight decoded "zones", each zone being 90° with four zones being in quadrature (45° shifted) from the other four zones. FIG. 4B shows the gate level electronic logic circuitry that accomplishes this. The four primary quadrant outputs, Level (L), Plumb (P), Inverted Level (IL) and Inverter Plumb (IP) from octant decoder 52 are used to select the appropriate quadrant for calibration word reading and writing. The other four quadrature quadrant outputs Level/Plumb (LP), Inverted-Level/Plumb (ILP), Inverted Level/Inverted Plumb (ILIP) and Level/Inverted Plumb (LIP) are used only during the user Offset Mode.

DISPLAY/TONE PROCESSING

Control of the seventeen segment operation display 12 segments and eight tones as generated by tone generator 60 of FIG. 2 is under program control by the microcontroller 50. After a successful calibration cycle and storage of the calibration word for any particular quadrant the following sequence occurs:

Initially one starts with the eight bit calibration word, and binary 1110 (E hex) is added to the calibration word, which represents a "level" display and tone, the sum of these two values resulting in the FDAC binary word sent to the FDAC 38. The data result from this FDAC 38 word is saved in a temporary register of the microcontroller 50. Binary 10 (2 hex) is no added to the FDAC word and the result is again saved. Three possible results from these two readings may occur. 1) If the result out of the averager of these two successive data bits is 01, no change in the display/tone occurs and the FDAC word is decremented by 10 binary. 2) If the result is 00, the display is incremented by one segment to the right and the FDAC word incremented by binary 10. 3) If the result is 11 the display is decremented by one segment and the FDAC word decremented by binary 10.

This process continues indefinitely, continuously updating the display and tracking the 0/1 null with two successive data pairs of data results. If the FDAC word reaches either ±16 decimal away from the calibrated "level" FDAC word, the FDAC is not incremented (decremented) any more until the data comes back into a ±16 decimal range of the FDAC calibration word. Each 2 bit "bin" of the FDAC word about a ±16 bit range of the calibration word corresponds to a display segment and tone frequency.

Assume that the physical position of the sensor 34 was such that the change in data from a 0 to a 1 occurs when the FDAC word equals the calibration word plus 0111 binary. When the FDAC word is then less than the calibrated word, the averaged data is a 0 until the FDAC word equals the calibration word. Thereafter the averaged data is a 1. This corresponds to a "level" condition and all 16 display segments on either side of the 17th center segment would be out, with only the center segment on, indicating "level".

If the sensor 34 were now slightly rotated counterclockwise (CCW), the change in data from a 0 to a 1 would occur earlier in the 16 bin FDAC cycle, and those display segments corresponding to the FDAC bins where data was a 1 that are to the left of the center segment would be illuminated. If the sensor 34 was significantly rotated CCW from the "level" position (assuming that the quadrant has not changed) all eight display segments 12 to the left of the center segment 12a would be on. Therefore, seventeen unique states exist within each quadrant that describe the position of the sensor 34 relative to "level".

In addition each unique one-sided display state is associated with a certain tone from tone generator 60 for audible user feedback, with the exception that when all eight "side-segments" of scale 12 are on, no tone output occurs. The same tone frequency is used for corresponding left and right display segments of scale 12. Representative states of scale 12 and the tones are shown in FIG. 5, showing the relationship for all sensor orientations between the FDAC word, averaged data output ("Data Results"), operational display segments 12, and tone output from tone generator 60.

Note in FIG. 5 that the relative polarity of th data bit for any FDAC step and the corresponding display segment actuation reverses from left of center to right of center. The microcontroller 50 program coordinates this change. The seventeenth "center" or "level" display segment 12a is enabled when the 0/1 data transition is between FDAC subset words 7 and 8. Again, the microcontroller 50 detects this condition.

The tones 1 through 8 are for example a B major musical scale with tone 1 being B (493.9Hz) and tone 8 being B (987.8Hz).

Each FDAC step represents a slope weight of 1/128"/foot, so two FDAC steps represent 1/64"/foot of slope. Thus a calibrated display scale may be used representing the amount of slope offset from the true "level" position. The display scale 12 then has a range of $\pm \frac{1}{8}$"/foot.

All four primary quadrants of inclination are similarly treated, with the exception that the averaged data polarity is reversed in the plumb and inverted plumb quadrants. The microcontroller 50 again takes care of this detail. This polarity change is due to the physical relationship of pairs of sensor 34 electrodes A, B, C, D. For example, in the Level quadrant, electrodes B and C are active with B being on the right. But in the plumb quadrant, electrodes A and B are used with B now being on the left. This change from right to left changes the polarity of the resulting data.

FIXED OFFSET MODE

This mode is almost identical to the above described normal mode, with the exception that it is only valid in the Level quadrant and the CDAC 40 word is changed from range center (1000 binary) to some other word, causing an offset to occur.

The weighing of each CDAC bit is $\frac{1}{8}$"/foot of slope, so that changing the CDAC word from 1000 to either 0111 or 1001 causes a $\frac{1}{8}$"/foot offset. The level must now be rotated CW (or CCW) until a new display null or "level" is found. At this point, the level's slope relative to true level is ⅛"/foot off.

Thus, changing the CDAC word by two bits causes a ¼"/foot offset or by eight bits, a 1"/foot offset. This requires seventeen states of the CDAC word (center range, +8 bits, −8 bits). This is accomplished by putting a "1" into the normally "0" input of the CDAC R-2R resistor termination port of FIG. 3B. With the CDAC word at 1111 and the termination input at a 0, 15/16 of the output voltage is derived. However, when the termination port is at a 1, all five inputs to the resistor ladder network are a 1, causing the output to equal the supply voltage at the CDAC output or 16/16 of the supply voltage. Thus, going from 0/16 to 16/16 represents seventeen discrete voltage steps.

Since the level may be operated when inclined either CW or CCW from true level, two displays can exist for any given slope offset (i.e. +⅛"/foot or −⅛"/foot). Automatic detection of which side of true level is done by removing the CDAC offset temporarily, restoring the Normal Mode CDAC state of 1000, and determining on which side of true level the unit is oriented. With this information, the microcontroller can then select the appropriate CDAC offset word for either CW or CCW operation.

USER OFFSET MODE

This mode allows the user to set a "level" display (null) condition anywhere within 360°°. This is done by increasing the gain of the CDAC offset voltage steps to allow coverage of about +50° within each quadrant. This ensures overlap with the adjacent quadrants so that no gaps occur between adjacent quadrants.

Figure 6:
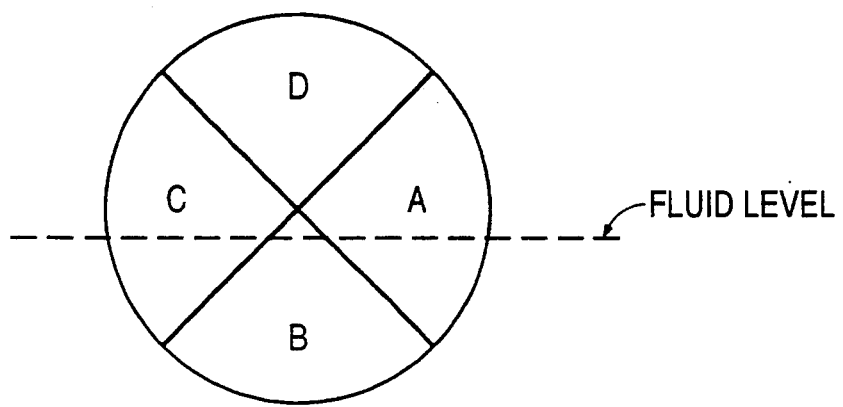
FIG. 6 shows wetting of the capacitive sensors in accordance with the invention.

Because a "level" or null condition could be set by the user very close to 45° away from true level or plumb, a special condition must be detected and corrected. If the sensor null condition were set at 45° away from true level the sensor plate condition would be as shown in FIG. 6, and electrodes A and C would be equally covered.

But the logic from the sensor comparators U1, ..., U4 to the early/late flip-flop U5 in signal processor latch 42 requires that no opposite pair of electrodes are used together, due to the timing signals from electrode A or electrode B generating the early/late flip-flop's clock signal. Due to this OR'ing function, as the sensor was rotated CW away from the 45° orientation, fluid coverage of electrode A would increase and electrode B would decrease causing an increase in the clock signal timing delay. Similarly, if the sensor were rotated CCW from the 45° position, fluid coverage of electrode A would decrease and of electrode B increase, again causing an overall increase in the clock delay time. This would result in an increase in the clock signal regardless of the rotation away from 45°, rather than an increase for one rotation direction and a decrease for the other which is what is wanted and what normally occurs.

To correct this, the quadrature quadrants are decoded (level/plumb), (inverted level/plumb, etc.), and this information is used along with the decoded primary quadrant information to disable one of the two opposite electrodes.

In operation, the SAR routines in microcontroller 50 for both the CDAC 40 and FDAC 38 are performed and the eight decoded quadrants (primary and quadrature) are then saved by the program of microcontroller 50. Even though the sensor 34 orientation could be very close to 45°, after both SAR routines, a unique set of quadrant information will exist due to system noise being less than one LSB (least significant bit) of the FDAC 38. The following Table A shows the various sensor disable conditions along with the encoding of the eight quadrants to accomplish this:

TABLE A

| Range | Quadrant Logic | Sensor Disabled |
|---|---|---|
| 0° to 45° | L•LP | A |
| 45° to 90° | P•LP | C |
| 90° to 135° | P•ILP | D |
| 135° to 180° | IL•ILP | B |
| 180° to 225° | IL•ILIP | C |
| 225° to 270° | IP•ILIP | A |
| 270° to 315° | IP•LP | B |
| 315° to 0° | L•LIP | D |

Figure 7:
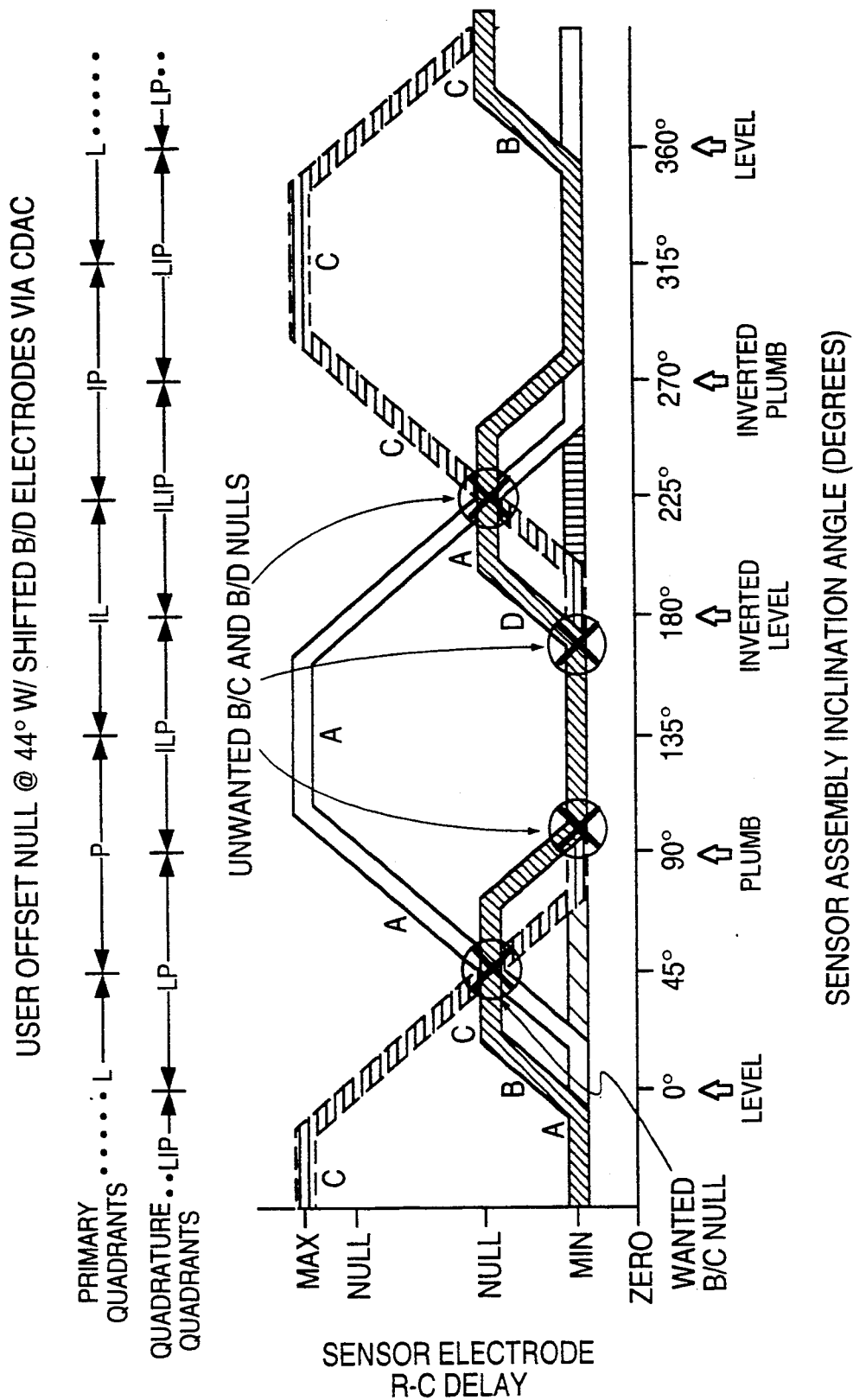
FIG. 7 shows extraneous sensor electrode nulls.

One other anomaly occurs while in user offset mode. Extraneous nulls occur at sensor orientations other than the desired position. Note in FIG. 4A that if the desired null was at 44°, electrode A would be disabled per the foregoing discussion and electrodes B and C would be the active pair determining the null point. The SAR routine would, for a null at this point, essentially shift the B/D electrode timing via the CDAC 40 output for this to occur. FIG. 7 shows this shifted electrode timing along with the undesired null points. The undesired null points are disabled by only allowing operation of the display in the 0/45° octant and either octant on both sides of the 0/45° octant by sensor disable logic 62 of FIG. 4B. This eliminates any ambiguous display.

The logic to accomplish this is two fold. First, the eight quadrants (primary and quadrature) are decoded and stored after the SAR routines. Second, the stored quadrant information is compared in real time to the current operating quadrants. Note that there are always two current, operating quadrants—one primary and one quadrature.

The gate level logic diagram of FIG. 4B shows how this is done. The signals on the octant memory bus OCTM, from the non-volatile memory 52 via the microcontroller 50 are compared to the locally generated octant information (OCT bus) by display enable logic 60 and this enables or disables the display 10 via line UODE, User Offset Display Enable.

For example, if the Octant Memory were stored at 44°, the two quadrants Level (L) and level/plumb (LP) would be a "1". These two signals are AND'd together in gate U6. The two operational quadrants L and LP are OR'd together in gate U7. Both these signals in turn are AND'd in gate U8 so that if either L or LP is operational, UODE is a "1", enabling the user display. The other seven quadrant pairs are similarly treated.

This disclosure is illustrative and not limiting; further modifications will be apparent to one skilled in the art in light of this disclosure and are intended to fall within the scope of the appended claims.

We claim:
1. An inclination sensor device comprising:
   a sensor for determining an inclination of the device relative to a null inclination; and
   a visual display for displaying the determined inclination, the visual display comprising a plurality of illuminated parallel and adjacent line segments, each line segment representing a predetermined increment of inclination expressed as a linear deviation per linear length, a particular number of line segments being displayed for each said determined inclination.

2. The device of claim 1, wherein the linear deviation is expressed in increments of 1/64 of an inch and the linear length is a foot.

3. The device of claim 1, further comprising a mode controller for operating the display in any of a plurality of modes, each mode establishing said null inclination at a particular inclination relative to the gravitational plane of the earth and each mode being automatically operative at level, plumb, inverted level, and inverted plumb.

4. The device of claim 3 further comprising a housing for the sensor and display, and, wherein one of the modes is a user programmable mode wherein a user sets the particular inclination at any arbitrary inclination without changing a position of the sensor relative to the housing.

5. The device of claim 3, wherein the display includes an alphanumeric display annunciator indicating in which of the plurality of modes the device is currently operating.

6. The device of claim 1, wherein only a central one of the line segments is illuminated when the device is at the null inclination.

7. The device of claim 1, the display further comprising an indication that the device is out of calibration range when the device has not been calibrated at that particular inclination.

8. The device of claim 1, wherein each fourth line segment is longer than are adjacent line segments.

9. The device of claim 1, wherein the display further comprises two right triangle icons, a first of the two having its hypotenuse slanting up to the left and the second of the two having its hypotenuse slanting up to the right, the display displaying one or another of the two right triangles in response to the determined inclination about true level, thereby graphically depicting the rotation of the device from true level.

10. The device of claim 1, further comprising an audible indication of the determined inclination, the audible indication being one musical tone of a scale of musical tones, each tone of the scale being sequentially associated with at least one of the line segments of the visual display.

11. The device of claim 10, wherein during changing of the inclination of the device the audible indication is a plurality of the music tones in sequence.

12. An inclination sensor device comprising:
a sensor for determining an inclination of the device relative to a null inclination; and
an audible tone generator for generating musically scaled audible tones, one of the tones being generated for one or more of a plurality of determined inclinations of the device;
wherein the tones are in sequential association with increasing determined inclination, and wherein during changing of the inclination of the device the tone generator provides a plurality of the tones in sequence of the musical scale.

13. The device of claim 12, wherein the tone generator generates one of the highest or lowest tone of the scale when the determined inclination is farthest from the null inclination.

14. A method of indicating angular deviation of a level from a particular inclination, comprising:
providing on the level a scale display having a plurality of parallel and adjacent line segments;
sensing an amount of the angular deviation of the level;
illuminating one or more of the line segments to indicate each amount of angular deviation of the level, each illuminated line segment indicating an incremental deviation of a particular linear distance per length.

15. The method of claim 14, further comprising the steps of:
establishing a null at which the level indicates no inclination; and
setting the null to be other than level or plumb relative to a plane of the earth's gravitational field.

16. A method or indicating angular deviation of a level from a particular inclination, comprising the steps of:
sensing an amount of the angular deviation of the level;
generating an audible tone in a musical scale, each tone being associated with a particular amount of the sensed deviation, wherein the tones are in sequential association with increasing sensed amount of angular deviation.

17. An inclination sensing device comprising:
a plurality of sensor elements, each sensing capacitance changes in response to inclination;
a comparator associated with each sensor element for detecting a voltage of each sensor element in response to an excitation cycle of said sensor element;
a first digital to analog converter for supplying a first reference voltage to certain of the comparators;
a second digital to analog converter for supplying a second reference voltage to a remainder of the comparators; and
signal processor circuitry for determining and displaying the inclination in response to output signals of the comparators, the signal processor circuitry averaging the output signals of the comparator over a predetermined number of the excitation cycles.

18. The device of claim 17, wherein unless the averaged value is either greater than or equal to a predetermined value by a fixed amount, the determined inclination value is not displayed.

19. The device of claim 17, further comprising a processor for providing a digital input signal to each of the first and second digital to analog converters for conversion to the respective first and second reference voltages, wherein the digital input signals are expressed in steps, and each step is equivalent to a fixed vertical distance of inclination per linear horizontal distance.

20. The device of claim 19, wherein the processor further includes:
means for adding additional digital input signals to a digital signal held in each digital to analog converter, thereby shifting a null position determined by the device; and
means for setting the additional digital signal alternatively to one of at least two values.

21. An inclination sensor device comprising:
a sensor for determining an inclination of the device relative to a null inclination; and
a visual display for displaying the determined inclination, the visual display comprising a plurality of illuminated parallel and adjacent line segments, each line segment representing a predetermined increment of inclination expressed as a linear deviation per linear distance, a particular number of line segments being displayed for each said determined inclination;

wherein each fourth line segment is longer than are adjacent segments.

22. An inclination sensor device comprising:
a sensor for determining an inclination of the device relative to a null inclination; and
a visual display for displaying the determined inclination, the visual display comprising a plurality of illuminated parallel an adjacent line segments, each line segment representing a predetermined increment of inclination expressed as a linear deviation per linear distance, a particular number of line segments being displayed for each said determined inclination;
wherein the display further comprises two right triangle icons, a first of the two having its hypotenuse slanting up to the left and the second of the two having its hypotenuse slanting up to the right, the display displaying one or another of the two right triangles in response to the determined inclination about true level, thereby graphically depicting the rotation of the device from true level.

23. The device of claim 1, wherein the linear deviation is expressed in increments of an inch per a predetermined linear length.

24. The device of claim 5, the plurality of modes including fixed offset mode, variable offset mode, the normal mode.

25. The device of claim 1, wherein the visual display includes an annunicator portion solely for showing in which one of a plurality of modes the display is operating.

* * * * *

UNITED STATES PATENT AND TRADEMARK OFFICE
CERTIFICATE OF CORRECTION

PATENT NO.   :   5,313,713
DATED        :   May 24, 1994
INVENTOR(S)  :   Charles E. Heger
                 Donald D. Kook It is certified that error appears in the above-identified patent and that said Letters Patent is hereby corrected as shown below:

Column 2, line 46
        delete "nd" and insert -- and --.

Column 3, line 17
        delete "th" and insert -- the --.

Column 4, line 62
        delete "arrows".

Column 4, line 66
        delete "off calibrated" and insert -- off:
calibrated --.

Column 5, line 14
        delete "Fig. 1B" and insert -- Fig. 18 --.

Column 5, line 26
        delete "-".
    Column 5, line 44
        delete "no" and insert -- now --.

Column 6, line 30
        delete "th" and insert -- the --.

Column 7, line 29
        delete "°".

UNITED STATES PATENT AND TRADEMARK OFFICE
CERTIFICATE OF CORRECTION

PATENT NO.   : 5,313,713
DATED        : May 24, 1994
INVENTOR(S)  : Charles E. Heger
               Donald D. Kook It is certified that error appears in the above-identified patent and that said Letters Patent is hereby corrected as shown below:

```
Column 7, line 31
     delete "+ 50" and insert -- ± 50 --.

Column 11, line 8
     delete "an" and insert -- and --.

Column 12, line 10
     delete "the" and insert -- and --.
```

Signed and Sealed this

Eleventh Day of October, 1994

Attest:

Attesting Officer

BRUCE LEHMAN

Commissioner of Patents and Trademarks